(12) United States Patent
Ranjan et al.

(10) Patent No.: US 11,275,715 B2
(45) Date of Patent: Mar. 15, 2022

(54) METHOD AND SYSTEM FOR ACTIVE PROCESS MONITORING ACROSS MULTIPLE INDEPENDENT SYSTEMS

(71) Applicant: JPMorgan Chase Bank, N.A., New York, NY (US)

(72) Inventors: Priya Ranjan, Kendall Park, NJ (US); Jooi-Teong Chuah, East Brunswick, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 313 days.

(21) Appl. No.: 16/206,470

(22) Filed: Nov. 30, 2018

(65) Prior Publication Data

US 2020/0174972 A1    Jun. 4, 2020

(51) Int. Cl.
| | |
|---|---|
| *G06F 16/17* | (2019.01) |
| *G06F 11/30* | (2006.01) |
| *G06F 9/54* | (2006.01) |
| *G06N 20/00* | (2019.01) |
| *G06F 16/338* | (2019.01) |

(52) U.S. Cl.
CPC .......... *G06F 16/1734* (2019.01); *G06F 9/542* (2013.01); *G06F 11/3006* (2013.01); *G06F 16/338* (2019.01); *G06N 20/00* (2019.01)

(58) Field of Classification Search
CPC .... G06F 16/1734; G06F 15/00; G06F 16/338; G06F 9/542; G06F 11/3006; G06N 20/00
USPC ........................................................ 707/687
See application file for complete search history.

(56) References Cited

U.S. PATENT DOCUMENTS

| | | | | |
|---|---|---|---|---|
| 7,120,558 | B2* | 10/2006 | McIntyre | G05B 23/0216 |
| | | | | 702/183 |
| 7,809,868 | B1* | 10/2010 | Mu | G06F 3/0604 |
| | | | | 710/74 |
| 9,922,113 | B2* | 3/2018 | Seiver | G06F 16/00 |
| 2002/0038228 | A1* | 3/2002 | Waldorf | G06Q 10/06 |
| | | | | 705/7.37 |
| 2005/0228916 | A1* | 10/2005 | Telesco | G06F 21/554 |
| | | | | 710/200 |
| 2006/0005085 | A1* | 1/2006 | Zunino | G06F 11/3495 |
| | | | | 714/38.11 |
| 2012/0246303 | A1* | 9/2012 | Petersen | G06F 16/1734 |
| | | | | 709/224 |
| 2013/0103749 | A1* | 4/2013 | Werth | G06F 9/453 |
| | | | | 709/203 |
| 2017/0017693 | A1* | 1/2017 | Storl | G06F 16/1734 |

(Continued)

*Primary Examiner* — Giovanna B Colan
(74) *Attorney, Agent, or Firm* — Hunton Andrews Kurth LLP (57) ABSTRACT

The invention relates to implementing a system that monitors a process across multiple monitored computer systems. According to an embodiment of the present invention, the system comprises: a communications network; two or more monitored computer systems; an active monitoring agent computer system; and a database; the processors of the two or more monitored computer systems being configured to execute one or more steps of a process; the processor of the active monitoring agent computer system being configured to receive a predefined flow configuration for the process, generate a query to retrieve log data for the process, generate an alert if the process exceeds the maximum time to wait for completion for any step of the process, and store the log data in the database.

20 Claims, 4 Drawing Sheets

(56) References Cited

U.S. PATENT DOCUMENTS

| | | | |
|---|---|---|---|
| 2018/0150477 A1* | 5/2018 | Jewell | G06F 16/172 |
| 2018/0276234 A1* | 9/2018 | Wei | G06F 16/2308 |
| 2019/0004891 A1* | 1/2019 | Bi | G06F 11/0793 |
| 2019/0199612 A1* | 6/2019 | Manoharan | H04L 43/16 |
| 2019/0361784 A1* | 11/2019 | Savanur | G06F 11/3447 |

* cited by examiner

METHOD AND SYSTEM FOR ACTIVE PROCESS MONITORING ACROSS MULTIPLE INDEPENDENT SYSTEMS

FIELD OF THE INVENTION

The present invention generally relates to actively monitoring a process as it flows through multiple independent systems and/or services.

BACKGROUND OF THE INVENTION

Monitoring a process flow which traverses across many systems is complicated and cumbersome as there is no one system which is the master or responsible for overall management. Moreover, a process may become stuck on a particular step and stop writing to a log file, which makes it difficult to monitor and alert in a timely fashion for corrective action to be taken. This can greatly increase problem or issue resolution time.

Monitoring end-to-end flow for failures or delays is challenging and oftentimes problems may only be detected or investigated after a particular end user opens a support issue. There may be a tendency in support staff to terminate the instance of a process and initiate a new instance, which might again fail and compound the problem. The reputation of a process may suffer as a result, and the underlying application may be deemed unreliable. The use of cloud provisioning may further aggravate this problem.

Current methods of monitoring processes through multiple systems are not agentless and require software to be installed on the underlying systems being monitored. Existing methods of monitoring processes through multiple systems therefore must be run within the systems being monitored. Existing systems do not have a mechanism to track overall process timings in order to measure whether a problem is getting better or worse as changes are made. In many cases, it is difficult to determine the current state of a multi-system process and predict when it will get completed.

These and other shortcomings exist in current methods of process flow monitoring.

A need therefore exist for a solution that can monitor a process traveling through multiple systems, following it through completion while detecting failures, sluggishness, or hung processes and generating appropriate alerts.

SUMMARY OF THE INVENTION

Exemplary embodiments provide a system and method to monitor a process executing across multiple monitored computer systems. According to one embodiment, a computer-implemented system comprises: a communications network; two or more monitored computer systems, each comprising at least one processor, coupled to the communications network; an active monitoring agent computer system comprising at least one processor, coupled to the communications network; and a database. According to one embodiment, the processors of the two or more monitored computer systems are configured to execute one or more steps of the process, and the at least one processor of the active monitoring agent computer system is configured to: load a predefined flow configuration for the process, comprising an expected time to completion and a maximum time to wait for completion for each step of the process; generate a query to retrieve log data for the process; generate an alert if the process exceeds the maximum time to wait for completion for any step of the process; and store the log data in the database.

In other embodiments, a computer-implemented method to monitor a process executing across multiple independent computer systems may comprise the steps of: initiating, by a first independent computer system, the process; initiating, by a remote monitoring computer system, an active monitoring agent process; executing one or more steps of the process on the first independent computer system; generating first log data on the first independent computer system; executing one or more steps of the process on a second independent computer system; generating second log data on the second independent computer system; loading, by the remote monitoring computer system, a predefined flow configuration, wherein the predefined flow configuration comprises an expected time to completion and a maximum time to wait for completion for each step of the process; generating a query to retrieve the first log data; generating a query to retrieve the second log data; generating an alert if the process exceeds the maximum time to wait for completion for any step of the process; and storing the first log data and the second log data in a database.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

One of ordinary skill in the art will readily appreciate that the present invention provides advantages over existing process monitoring methods through, for example, an external active monitoring agent running outside of the involved systems. The active monitoring process may allow for a monitor agent to follow a process as it moves through multiple systems through completion while detecting failures, sluggishness or hung processes and generating appropriate alerts.

Embodiments are herein described enabling a plug and play architecture that may be plugged in to monitor any set of events through completion. This architecture may not require agents to be installed on the monitored systems. Instead, the monitoring may be data driven, where the event monitoring is based on a configuration file. According to certain embodiments, if a process flow changes, only the configuration file would need to be updated.

The monitoring agent may read a predefined flow configuration. The flow configuration may include such data as step number (what step the process is on), API call string, expected time for completion, and maximum time to wait for completion before generating an alert. The monitoring agent then may probe the logs of specific systems using an API call when the process is supposed to reach a specific system. This method enables the monitoring process to query the specific APIs for logs at the opportune time(s) and avoid flooding systems with unnecessary calls. This may also facilitate discovery of a sluggish or hung processes and further alert support team(s) and/or other recipients as needed.

Embodiments with alert functionality advantageously enable trigger mechanisms to extend the functionality of the monitoring architecture, for example with self-healing functionality and/or with predictive analytics based on machine learning.

The following descriptions provide different configurations and features according to exemplary embodiments. While certain nomenclature and types of applications/hardware are described, other names and application/hardware usage is possible and the nomenclature provided is done so by way of non-limiting examples only. Further, while particular embodiments are described, it should be appreciated that the features and functions of each embodiment may be combined in any combination as is within the capability of one of ordinary skill in the art. The figures provide additional exemplary details regarding the present invention. It should also be appreciated that these exemplary embodiments are provided as non-limiting examples only.

Various methods are provided by way of example herein. These methods are exemplary as there are a variety of ways to carry out methods according to the present disclosure. The methods depicted and described may be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Figure 1:
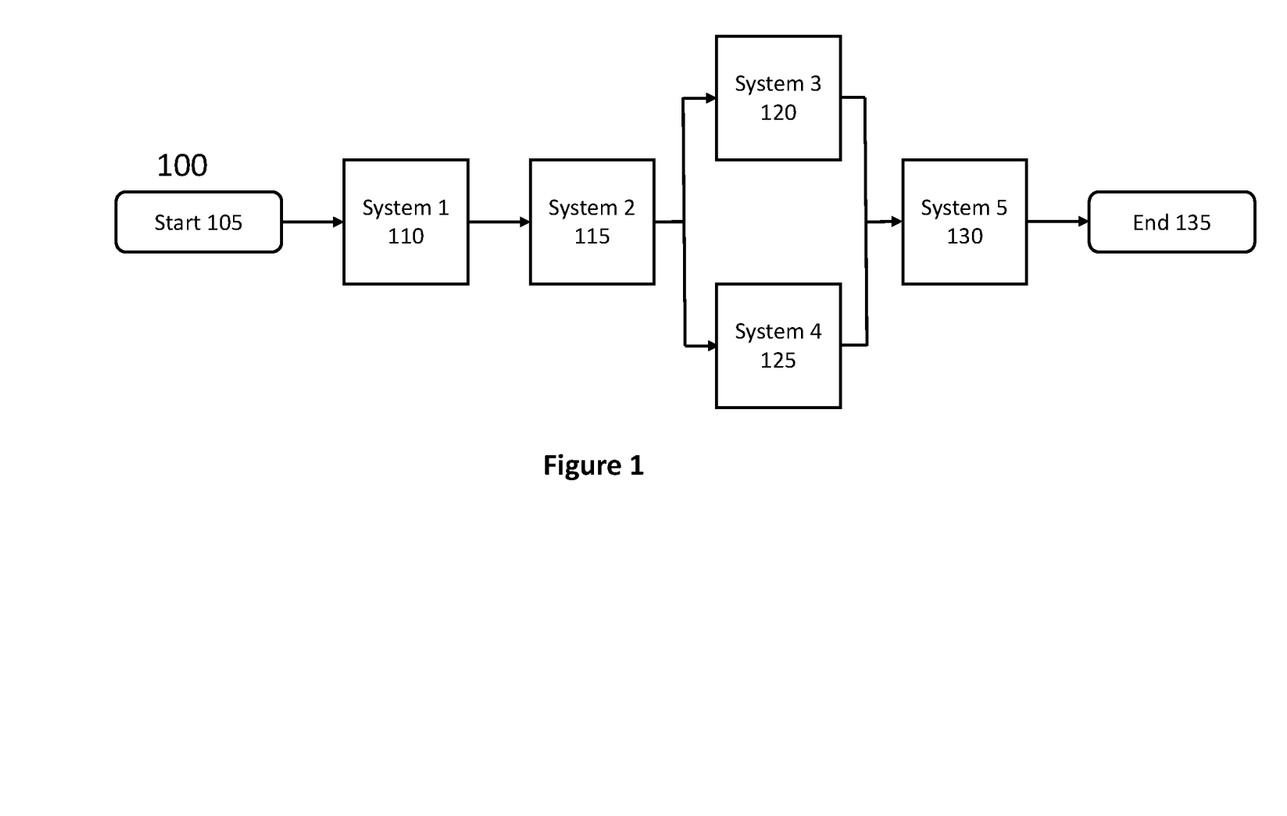
FIG. 1 is an exemplary diagram of a typical process flow going across multiple independent systems.

FIG. 1 is an exemplary diagram of a typical process flow going across multiple independent systems.

As illustrated, a process 100 may be initiated at 105. The process may then go through System 1 (110), System 2 (115), System 3 and System 4 (120 and 125), and System 5 (130) before terminating at 135.

Process 100 is exemplary, and any number of processes may be instantiated to travel through the five systems. A process instantiated five times, for example, may have five different threads travelling through each system from System 1 to System 5. Process 100 may be any desired process that travels through multiple systems, for example a credit card transaction process.

It may be desirable to track a process, for example process 100, from its beginning to end, without needing to install custom software on each system.

Figure 2:
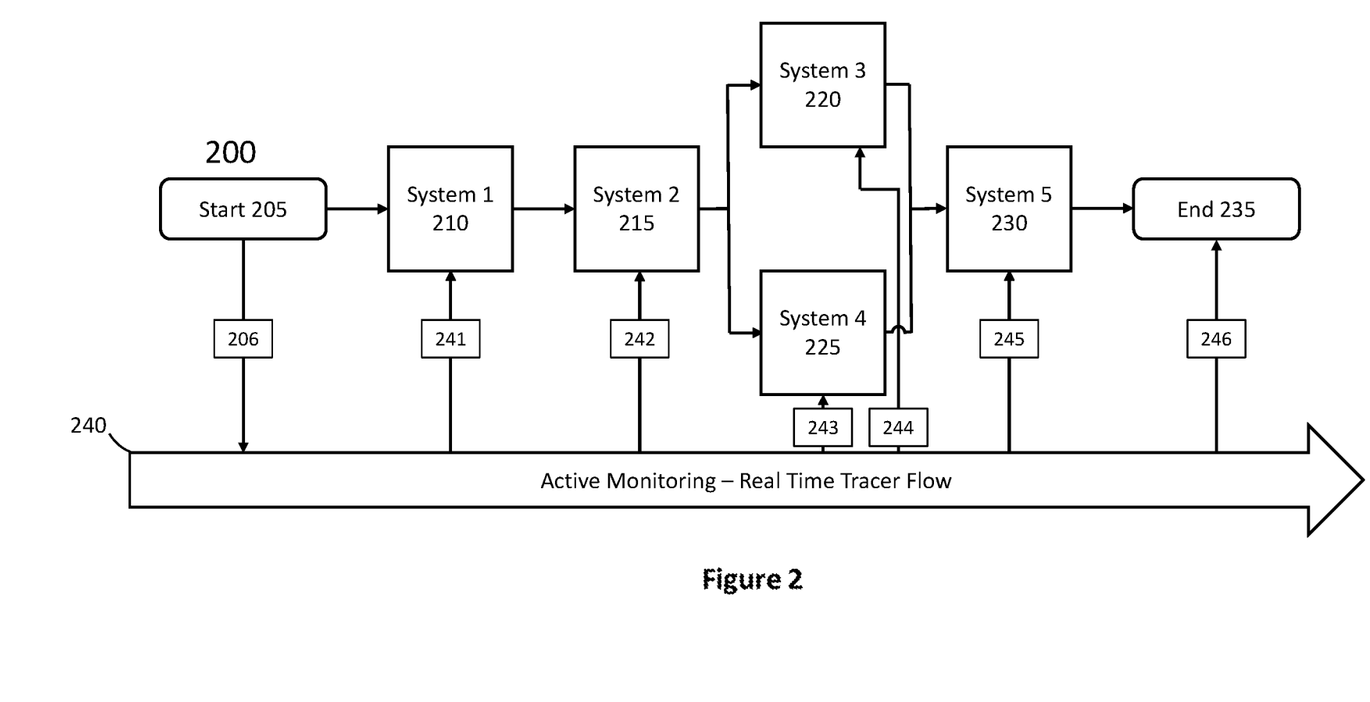
FIG. 2 is an exemplary diagram of a process flow going across multiple independent systems utilizing an active monitoring process, according to an embodiment of the present invention.

FIG. 2 is an exemplary diagram of a process flow going across multiple independent systems utilizing an active monitoring process, according to an embodiment of the present invention.

As shown in FIG. 2, a process 200 may be initiated at 205. The process may then go through System 1 (210), System 2 (215), System 3 and System 4 (220 and 225), and System 5 (230) before terminating at 235. Any number of processes may be instantiated to travel through the five systems. While five systems are illustrations, the various embodiments of the present invention may support other system configurations.

FIG. 2 additionally illustrates active monitoring according to an embodiment of the present invention. At the start of the process (205), an active, light weight monitoring agent 240 may be trigged at 206 by a first call in a workflow. At any stage in the process' lifespan, the monitoring agent 240 may make API calls to the logs of each system (241-246).

According to an embodiment of the present invention, the monitoring agent 240 may ping the same system multiple times.

According to an embodiment of the present invention, the monitoring agent 240 may monitor multiple individual threads.

The monitoring agent 240 may read a predefined flow configuration at the start. The flow configuration may define a set of specific steps that the process 200 is supposed to follow from end to end. The flow configuration may include, for example, an expected and maximum duration defined for each step. The monitoring agent 240 may probe the logs of each specific system using an API call. For example, the monitoring agent 240 may probe a specific system when the process is expected to have reached that system.

According to an embodiment of the present invention, the monitoring agent 240 may query the specific APIs for logs at opportune times in order to avoid flooding the systems with unnecessary calls. For example, the monitoring agent may limit itself to probing a system's API log to times based on the expected or maximum duration defined for each step.

Although the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
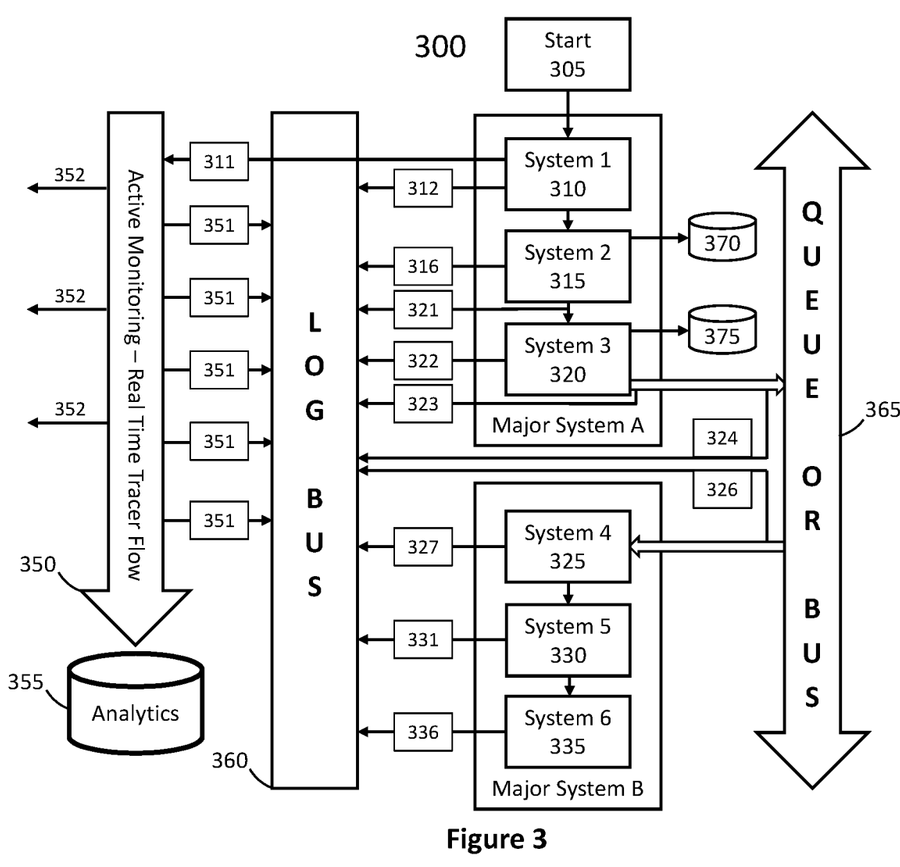
FIG. 3 is an exemplary diagram of a process flow going across multiple independent systems utilizing an active monitoring process and a log bus, according to an embodiment of the present invention.

FIG. 3 is an exemplary diagram of a process flow going across multiple independent systems utilizing an active monitoring process and a log bus, according to an embodiment of the present invention.

As shown in FIG. 3, an embodiment of the present invention is directed to actively monitoring the flow of a process through multiple systems with a log bus. As shown in FIG. 3, a process 300 is instantiated at start 305. This may be, for example, from a provisioning process. Upon initiating, the process 300 may trigger an active monitoring agent 350 with call 311.

The main process may begin in "Major System A," illustrated as a box containing multiple systems in FIG. 3. The process 300 may proceed from System 1 (310) to System 2 (315) to System 3 (320) within Major System A. At each system, the process 300 may log its status to the log bus 360, for example with calls 312, 316, and 322, at Systems 1, 2, and 3 respectively. At each system, the process 300 may read from or right to external databases, for example as illustrated with System 2 and System 3 with databases 370 and 375 respectively.

According to an embodiment of the present invention, the process 300 may log its status as it travels between systems, for example in the call 321 between System 2 and System 3.

The process 300 may leave Major System A by writing data or outputting a status to an external queue or bus 365. The process 300 may continue in Major System B, which may read from the queue or bus 365.

According to an embodiment of the present invention, the process 300 may log its status as it exits System 3, for example in the call 323. The process 300 may also log its status as it exits Major System A and outputs to queue or bus 365, for example in the call 324. The process 300 may also log its status as it enters Major System B, for example in the call 326.

The process 300 may then travel through System 4 (325), System 5 (330), and System 6 (335) of Major System B before terminating. At each system within Major System B, the process 300 may log its status to the log bus 360, for example in calls 327, 331, and 336.

At any time, the monitoring agent 350 may query the log bus 360 with API calls, for example as illustrated in the API calls 351. For example, the monitoring agent 350 may use a search engine, such as Elasticsearch, to query the log bus. Additionally, the monitoring agent 250 may generate alerts (352) in response to data from the log bus 360.

As the active monitoring agent 350 queries the log bus and generates alerts, it may store the log data in an analytics database 355. According to an embodiment of the present invention, the analytics database 355 may be an Apache Hadoop Distributed File system (HDFS). The analytics database 355 may also be a Cassandra File System (CFS), or any other suitable big data platform.

According to an embodiment of the present invention, the main process may be for an automated server build process, which may go through multiple steps. Major System A may comprise such systems as: a system for automated operating system build (e.g., as System 1), a system for storage provisioning (e.g., as System 2), a system for network configuration (e.g., as System 3), and/or any other systems as desired. Major System B may comprise such systems as: a system for environmental setup (e.g., as System 4), a system for additional software install on the machine (e.g., as System 5), an inventory system of records (e.g., as System 6), and/or any other systems as desired.

According to another embodiment of the present invention, the main process may be for a data provisioning flow where multiple systems are involved in ETL (Extract, Transform, and Load). Major System A may represent a mortgage processing system, where data flows between various subsystems such as receivables transactions, account posting, and mortgage balance systems. Major System B may represent a general ledger system, where many mortgages may hit the sub ledger and a firm's general ledger. Major System B may likewise be comprised of multiple subsystems.

According to an embodiment of the present invention, log data may comprise system information, for example information denoting the success or failure of the steps of the process, the time it took for each step, and any other information as desired.

Although the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
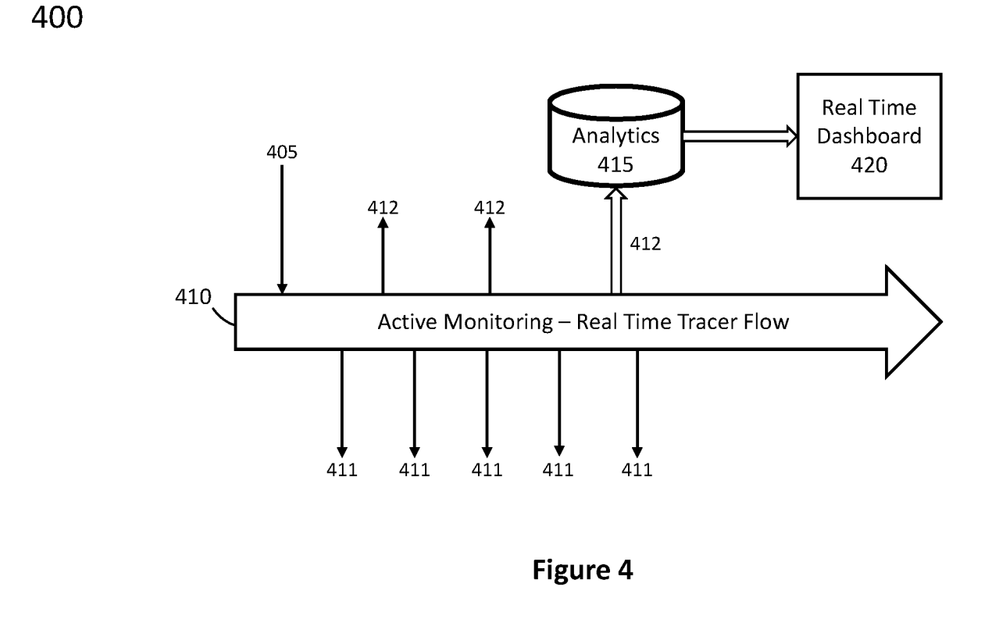
FIG. 4 is an exemplary diagram of an active monitoring process with a real time dashboard, according to an embodiment of the present invention.

FIG. 4 is an exemplary diagram of an active monitoring process with a real time dashboard, according to an embodiment of the present invention.

FIG. 4 illustrates an active monitoring process 400, for example one similar to as shown in FIGS. 2 and 3, with a real time analytics dashboard. Call 405 may represent a trigger call that starts the monitoring agent 410. The call arrows 411 may be API calls to different systems that a monitored process is travelling to. Alternatively, the call arrows 411 may be API calls to a log bus to which a monitored process reports. The call arrows 412 may represent alerts in response to the data received from the API call arrows 412. Data flow 412 represents a real-time output from the active monitoring agent 410 to an analytics database 415. A real time dashboard 420 may read from the analytics database 415 to provide a real time display of process performance.

According to an embodiment of the present invention, the analytics database 415 may be an Apache Hadoop Distributed File system (HDFS). The analytics database 415 may also be a Cassandra File System (CFS), or any other suitable big data platform.

For example, analytics database 415 may present real time information of all or some current activities as well as historical trends.

According to another example, active monitoring agent 410 may perform a self-healing process based on machine learning. Machine learning may be applied, for example, for predictive analytics, to identify hot spots before a failure occurs, and to perform active capacity management. For example, in addition to generating an alert, the monitoring agent 410 may restart a process or system, or generate a report.

According to an embodiment of the present invention, the monitoring agent may cause corrective action to be taken in response to a predicted hardware failure, software failure, or system slowdown in one of the monitored computer systems. According to one embodiment, the corrective action may comprise restarting the system, starting additional processes automatically to handle increased load, and any other corrective action as desired. Because the monitoring agent is aware of incoming and outgoing traffic to the system, the monitoring agent may alert a downstream system and/or take corrective action on behalf of a downstream system such as adding capacity.

In addition, the real time dashboard 420 may be implemented in a diagramming or vector graphics application as well as other visualization and presentation tools.

Although the process of FIG. 4 illustrates certain steps performed in a particular order, it should be understood that the embodiments of the present invention may be practiced by adding one or more steps to the processes, omitting steps within the processes and/or altering the order in which one or more steps are performed.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in various databases and data stores. For example, the database may comprise a single database or a collection of databases, dedicated or otherwise. According to an embodiment of the present invention, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions may be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system to monitor a process executing across multiple monitored computer systems, the system comprising:
   a communications network;
   two or more monitored computer systems, each comprising at least one processor, coupled to the communications network;
   an active monitoring agent computer system comprising at least one processor that is not installed on or run within the two or more monitored computer systems, coupled to the communications network; and
   a database;
   wherein the processors of the two or more monitored computer systems are configured to execute one or more steps of the process;
   wherein the at least one processor of the active monitoring agent computer system is configured to:
      receive a trigger by a first call in the process;
      responsive to the trigger, load a predefined flow configuration for the process, comprising a defined set of specific steps that the process is supposed to follow from beginning to end, an API call string, an expected time to completion for each step of the process, and a maximum time to wait for completion of each step of the process before generating an alert;
      generate a query for each of the one or more steps of the process, each at a time when, according to the configuration file, the process is supposed to arrive at the step being queried, in order to retrieve log data for the process;
      generate, upon a failed query for one of the one or more steps of the process at the time when the process is supposed to arrive at the step, a second query to retrieve log data for the process at the maximum time to wait for completion of the step;
      generate, upon a failed second query, an alert that the process exceeds the maximum time to wait for completion of the step; and
      store the log data in the database.

2. The computer implemented system of claim 1, wherein the at least one processor of the active monitoring agent computer system is configured to query each of the one or more monitored computer systems directly to retrieve log data.

3. The computer implemented system of claim 2, wherein the at least one processor of the active monitoring agent computer system is configured to query each of the two or more monitored computer systems according to a predefined schedule.

4. The computer implemented system of claim 2, wherein the at least one processor of the active monitoring agent computer system is configured to query at least one of the two or more monitored computer systems more than once.

5. The computer implemented system of claim 1, further comprising:
   a dashboard computer system, comprising at least one processor and a display, coupled to the database;
   wherein the at least one processor of the dashboard computer system is configured to retrieve and display the log data in real time.

6. The computer implemented system of claim 5, wherein the at least one processor of the dashboard computer system is further configured to:
   display historical log data retrieved at an earlier time on the display.

7. The computer implemented system of claim 1, wherein the at least one processor of the active monitoring agent computer system is configured to:
   apply machine learning to the log data to predict one of hardware failure, software failure, and system slowdown in one of the two or more monitored computer systems.

8. The computer implemented system of claim 7, wherein at least one processor of the active monitoring agent computer system is configured to:
   take corrective action in response to a predicted hardware failure, software failure, or system slowdown in the one of the two or more monitored computer systems, the corrective action comprising one or more of: restarting the system, starting additional processes automatically to handle increased load, alerting a downstream system, and adding capacity.

9. The computer implemented system of claim 1, wherein the processors of the two or more monitored computer systems are configured to execute multiple instances of the process simultaneously.

10. The computer implemented system of claim 1, further comprising:
    a log bus computer system comprising at least one processor, coupled to the communications network;
    wherein the processors of the two or more monitored computer systems are configured to output log data to the log bus computer system via the communications network; and
    wherein the at least one processor of the active monitoring agent computer system is configured to query the log bus computer system to retrieve log data.

11. A computer implemented method to monitor a process executing across multiple independent computer systems, the method comprising the steps of:
    initiating, by a first independent computer system, the process;
    initiating, by a remote monitoring computer system that is not installed on or run within any of the independent computer systems performing the process, an active monitoring agent process;
    executing one or more steps of the process on the first independent computer system;
    generating first log data on the first independent computer system;
    executing one or more steps of the process on a second independent computer system;
    generating second log data on the second independent computer system;
    receiving a trigger by a first call in the process;
    loading, by the remote monitoring computer system and responsive to the trigger, a predefined flow configuration, wherein the predefined flow configuration comprises a defined set of specific steps that the process is supposed to follow from beginning to end, an API call string, an expected time to completion for each step of the process, and a maximum time to wait for completion of each step of the process before generating an alert;
    generating a query for each of the one or more steps of the process on the first independent computer system at a time when, according to the configuration file, the process is supposed to arrive at the step being queried, to retrieve the first log data;

generating a query for each of the one or more steps of the process on the second independent computer system at a time when, according to the configuration file, the process is supposed to arrive at the step being queried, to retrieve the second log data;

generating, based on the configuration file and timing of generated queries, an alert if the process exceeds the maximum time to wait for completion for any step of the process, wherein the alert identifies the specific step that is sluggish or hung; and storing the first log data and the second log data in a database.

12. The computer implemented method of claim 11, comprising the additional step of:

querying the first independent computer system and the second independent computer system directly to retrieve the first log data and the second log data.

13. The computer implemented method of claim 12, wherein the querying is performed according to a predefined schedule.

14. The computer implemented method of claim 12, comprising the additional step of:

querying either the first independent computer system or the second independent computer system a second time.

15. The computer implemented method of claim 11, comprising the additional step of:

displaying, on a dashboard computer system, the first log data and the second log data in real time.

16. The computer implemented method of claim 15, comprising the additional step of:

displaying, on the dashboard computer system, historical log data retrieved at an earlier time.

17. The computer implemented method of claim 11, comprising the additional step of:

applying machine learning to the first log data and second log data to predict one of hardware failure, software failure, and system slowdown in either the first independent computer system or the second independent computer system.

18. The computer implemented method of claim 17, comprising the additional step of:

taking corrective action in response to a predicted hardware failure, software failure, or system slowdown in either the first independent computer system or the second independent computer system, the corrective action comprising one or more of: restarting the system, starting additional processes automatically to handle increased load, alerting a downstream system, and adding capacity.

19. The computer implemented method of claim 11, wherein multiple concurrent threads of the process are executing simultaneously on the first independent computer system and the second independent computer system.

20. The computer implemented method of claim 19, comprising the additional step of:

querying a log bus to retrieve the first log data and the second log data.

* * * * *